United States Patent [19]

Waterman

[11] Patent Number: 5,005,491
[45] Date of Patent: Apr. 9, 1991

[54] AUTOMOTIVE TRAY APPARATUS

[76] Inventor: Kathryn R. Waterman, 951 Promontory Dr. West, Newport Beach, Calif. 92660

[21] Appl. No.: 504,408

[22] Filed: Apr. 4, 1990

[51] Int. Cl.$^5$ ............................................. A47B 23/00
[52] U.S. Cl. ........................................ 108/46; 108/48; 108/152; 211/88
[58] Field of Search ................... 108/46, 44, 47, 48, 108/49, 152; 211/88, 87; 248/277, 293

[56] References Cited

U.S. PATENT DOCUMENTS

| 2,558,366 | 6/1951 | Madlena | 108/47 |
| 2,601,177 | 6/1952 | Smullen | 108/47 X |
| 2,721,777 | 10/1953 | Willis | 108/48 X |
| 2,833,608 | 5/1958 | Tobias | 108/48 X |
| 3,207,116 | 8/1965 | Wilson | 108/46 |
| 3,267,880 | 8/1966 | Bedol | 108/46 |
| 3,278,797 | 10/1966 | Tisdell | 248/277 X |
| 3,895,605 | 7/1975 | Goldman | 211/88 X |
| 3,904,041 | 9/1975 | Medgebow | 211/88 X |
| 4,763,579 | 8/1988 | Cibulak | 108/48 |

FOREIGN PATENT DOCUMENTS

| 385597 | 11/1921 | Fed. Rep. of Germany | 240/277 |
| 876088 | 8/1961 | United Kingdom | 108/46 |

Primary Examiner—Jose V. Chen
Attorney, Agent, or Firm—Leon Gilden

[57] ABSTRACT

An apparatus is set forth for securement to an associated door of an automobile, wherein the tray includes a series of recessed wells formed within the tray, including a first pair of mounting hooks fixedly secured to and aligned with a first side of the tray, with a second set of mounting hook members mounted to a side of the set orthogonally arranged to the first set of hooks. The hook members are further provided in the embodiment as extensible and retractable members to permit horizontal adjustment of the tray relative to the associated door. The tray optionally includes an extensible foot support mounted to an extensible bracket to stabilize the tray in an extended orientation.

3 Claims, 4 Drawing Sheets

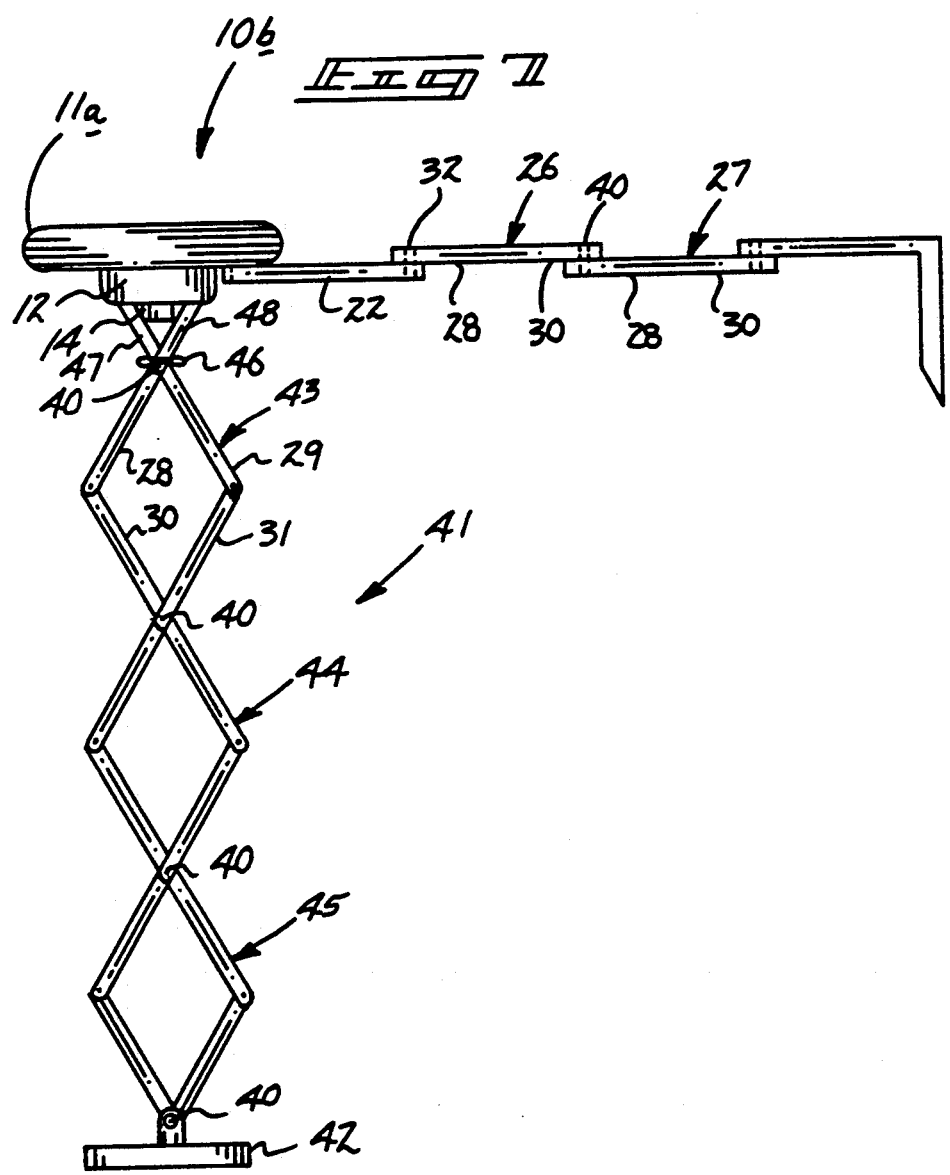

AUTOMOTIVE TRAY APPARATUS

BACKGROUND OF THE INVENTION

1. Field of the Invention

The field of invention relates to tray apparatus, and more particularly pertains to a new and improved automotive tray apparatus wherein the same is securable to an associated automotive door and extensible relative to the door to accommodate individuals within the automobile.

2. Description of the Prior Art

Tray structure for securement to automotive doors is known in the prior art. The prior art tray structure are utilized to assist positioning of various items relative to a door, particularly food items and the like, to provide a convenient support for such items. Typically, such trays are fixedly mounted to an associated door, wherein the instant invention comprises plural orthogonally arranged hook member pairs to permit selective orientation of the tray relative to an associated automotive door. Examples of the prior art include U.S. Pat. No. 2,296,028 to Gribble setting forth a serving tray for positioning adjacent an automotive door, wherein the tray includes forward and rear pairs of hooks and an underlying brace member for positioning against the door member of the associated automobile.

U.S. Pat. No. 1,896,971 to Ravlin sets forth a removable tray and support wherein an upper tray is mounted to a lower tray by a plurality of links, wherein the upper tray includes a plurality of rearwardly extending hook members for securement within the door of the associated automobile.

U.S. Pat. No. 2,123,257 to Provost sets forth a planar tray utilizing a series of downwardly extending depressions for receiving of receptacles therewithin, including rigid hooks mounted rearwardly of the tray for securement to a door.

U.S. Pat. No. 2,693,400 to Erickson sets forth a tray with a plurality of upwardly extending loops for securement to a rear seat of an automobile and downwardly extending bracket for positioning against the rear seat of an associated automobile.

U.S. Pat. No. 2,593,222 to Tracy sets forth a support for service trays wherein a "U" shaped clamp is mounted within a door mounting a clamp forwardly of the clamp.

As such, it may be appreciated that there continues to be a need for a new and improved automotive tray apparatus wherein the same addresses both the problems of ease of use, as well as effectiveness in construction and securement of the tray to an associated automotive door and in this respect, the present invention substantially fulfills this need.

SUMMARY OF THE INVENTION

In view of the foregoing disadvantages inherent in the known types of tray support apparatus now present in the prior art, the present invention provides an automotive tray apparatus wherein the same a selective plurality of hook members to permit selective orientation of the tray relative to an associated automotive door. As such, the general purpose of the present invention, which will be described subsequently in greater detail, is to provide a new and improved automotive tray apparatus which has all the advantages of the prior art support tray apparatus and none of the disadvantages.

To attain this, the present invention includes an apparatus setting forth securement to an associated door of an automobile, wherein the tray includes a series of recessed wells formed within the tray, including a first pair of mounting hooks fixedly secured to and aligned with a first side of the tray, with a second set of mounting hook members mounted to a side of the set orthogonally arranged to the first set of hooks. The hook members further provided in the embodiment as extensible and retractable members to permit horizontal adjustment of the tray relative to the associated door. The tray optionally includes an extensible foot support mounted to an extensible bracket to stabilize the tray in an extended orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive tray apparatus which has all the advantages of the prior art support tray apparatus and none of the disadvantages.

It is another object of the present invention to provide a new and improved automotive tray apparatus which may be easily and efficiently manufactured and marketed.

It is a further object of the present invention to provide a new and improved automotive tray apparatus which is of a durable and reliable construction.

An even further object of the present invention is to provide a new and improved automotive tray apparatus which is susceptible of a low cost of manufacture with regard to both materials and labor, and which accordingly is then susceptible of low prices of sale to the consuming public, thereby making such automotive tray apparatus economically available to the buying public.

Still yet another object of the present invention is to provide a new and improved automotive tray apparatus which provides in the apparatuses and methods of the prior art some of the advantages thereof, while simultaneously overcoming some of the disadvantages normally associated therewith.

Still another object of the present invention is to provide a new and improved automotive tray apparatus wherein the same permits selective and stabilized securement of a tray relative to an automotive door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic side view, taken in elevation, of a further modification of the instant invention.

DESCRIPTION OF THE PREFERRED EMBODIMENT

Figure 1:
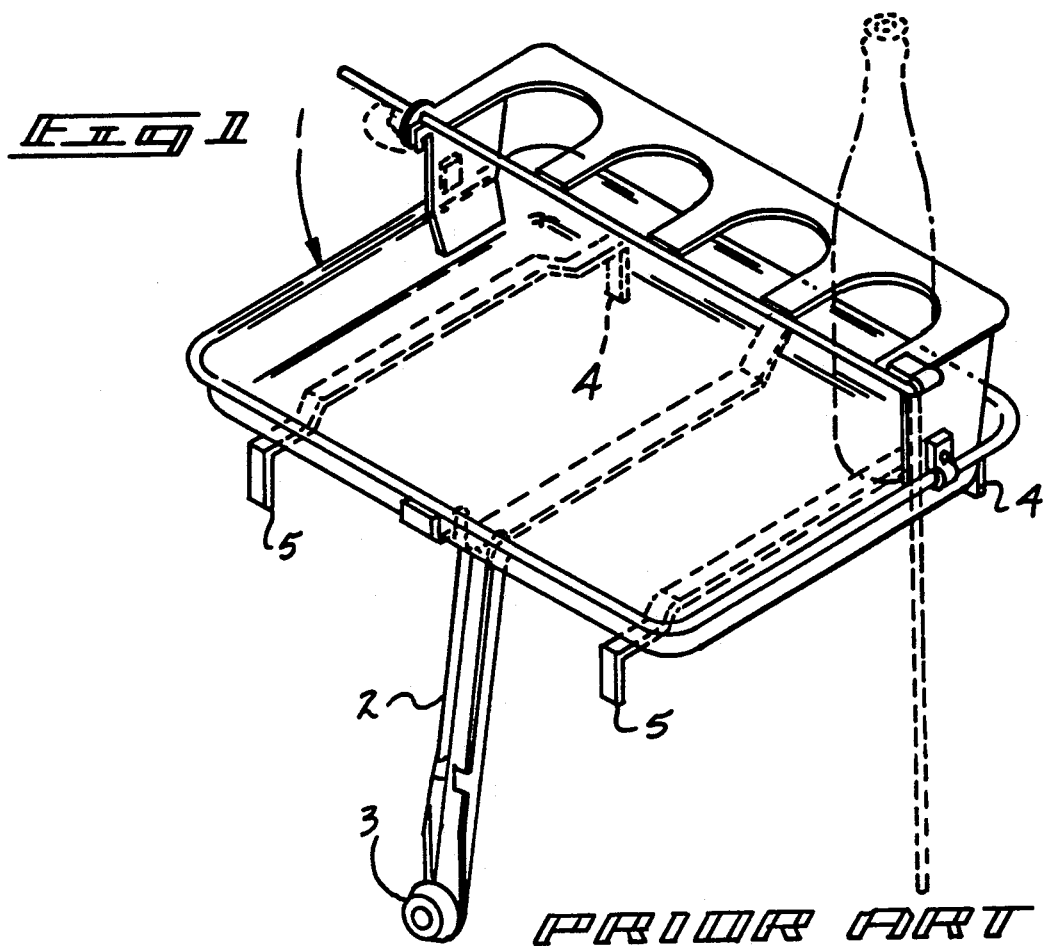
FIG. 1 is an isometric illustration of a prior art support tray apparatus.

With reference now to the drawings, and in particular to FIGS. 1 to 7 thereof, a new and improved automotive tray apparatus embodying the principles and concepts of the present invention and generally designated by the reference numerals 10, 10a, and 10b will be described.

Figure 2:
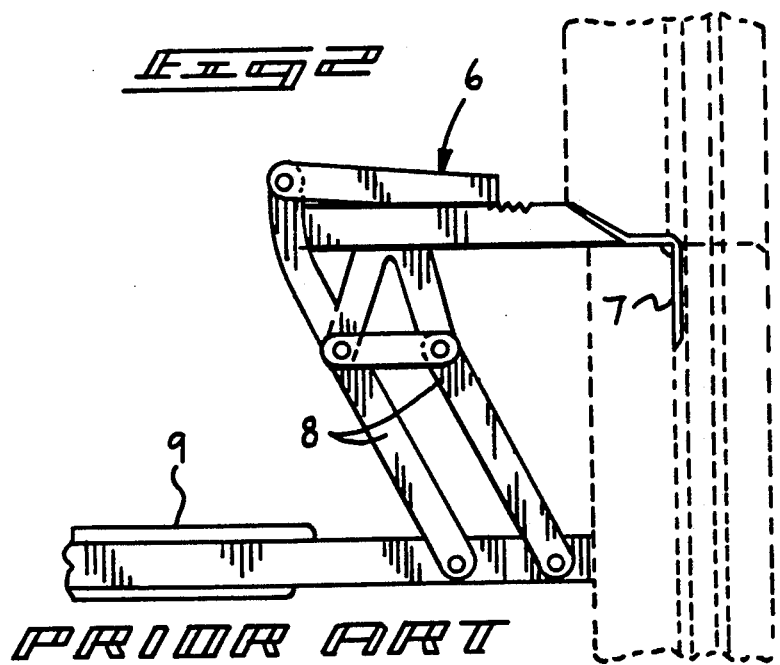
FIG. 2 is an orthographic side view, taken in elevation, of a further prior support tray apparatus.
Figure 3:
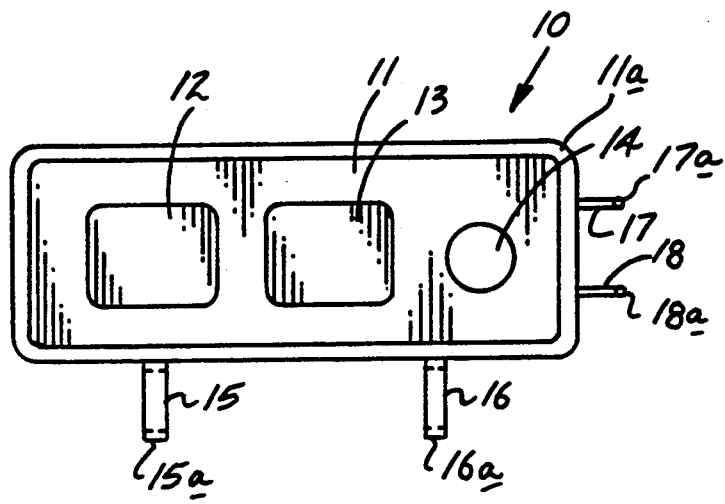
FIG. 3 is an orthographic top view of the instant invention.
Figure 4:
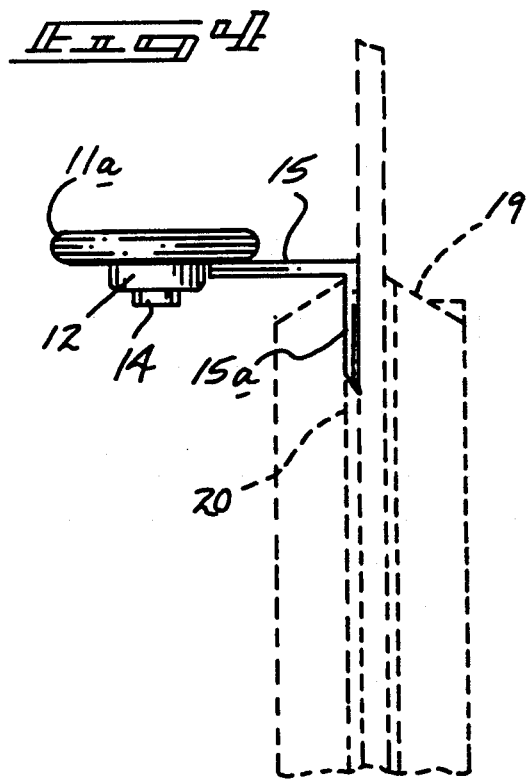
FIG. 4 is an orthographic side view, taken in elevation, of the instant invention.

FIG. 1 illustrates a prior art support tray structure 1, wherein a planar tray includes a plurality of forwardly extending brackets 4 and a plurality of rearwardly extending brackets 5 mounted in an aligned relationship relative to the tray, with a downwardly extending bracket 2 and an abutment member 3 positioned to provide abutment against an associated door for support of the tray. FIG. 2 illustrates a further support tray structure 6 utilizing brackets 7 extending rearwardly thereof mounting a lower tray 9 by a plural link arrangement 8 for abutment against an associated door, as illustrated.

More specifically, the automotive tray apparatus 10 of the instant invention essentially comprises a planar tray 11 comprising a planar floor formed with a rim wall 11a orthogonally oriented relative to the floor in a surrounding relationship thereto. A series of wells including a first well 12, a second well 13, and a fourth well 14 are aligned relative to one another. The first and second wells 12 and 13 are of a generally parallelepiped configuration to receive food commodities positioned therewithin, with the third well 14 defined as a cylindrical configuration. A first pair of hooks comprise a first and second horizontal leg 15 and 16, with a respective first and second vertical leg 15a and 16a respectively orthogonally and integrally mounted in a downward relationship relative to the respective first and second legs 15 and 16. A second pair of hooks comprise a third and fourth leg 17 and 18 extending in alignment with the tray and arranged orthogonally relative to the first hook pair defining a third and fourth leg 17 and 18 with a third and fourth vertical leg 17a and 18a fixedly and orthogonally directed downwardly relative to the first legs to permit securement of the tray in alignment or orthogonal relationship relative to the automotive door 19, wherein the vertical legs extend within the window slot 20 of the associated door for support of the tray apparatus.

Figure 5:
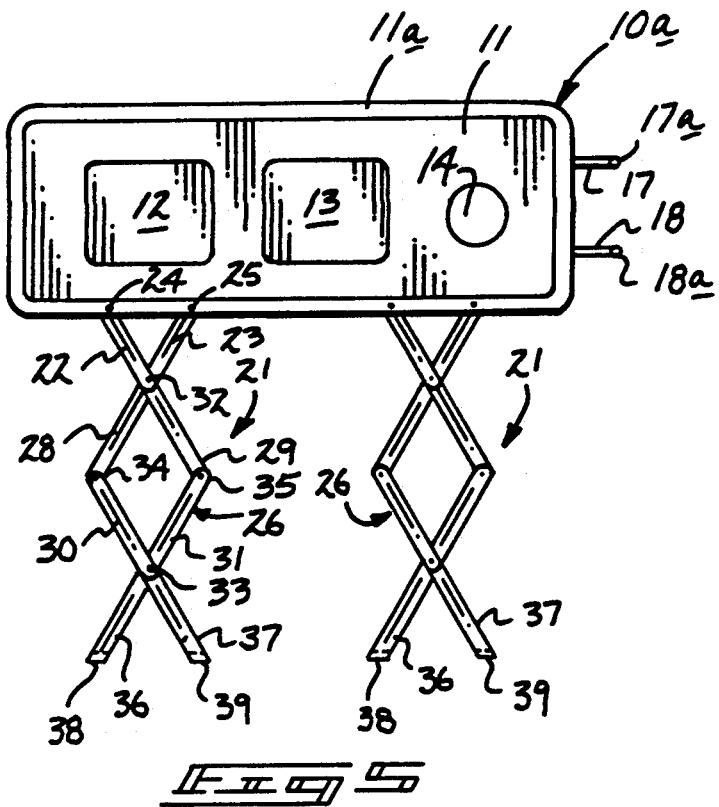
FIG. 5 is an orthographic top view of a modification of the instant invention.
Figure 6:
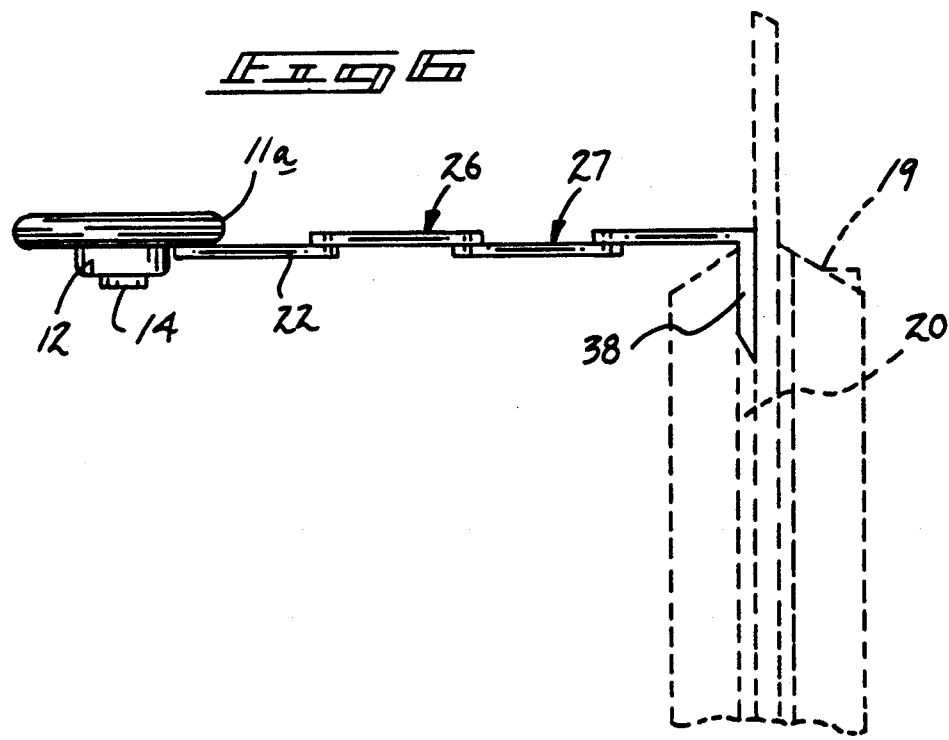
FIG. 6 is an orthographic side view, taken in elevation, of the modification of the instant invention, as illustrated in FIG. 5.

FIG. 5 illustrates a modified tray apparatus 10a, wherein the first hook pair utilizes a plurality of extensible link hooks 21. Each of the extensible link hooks 21 includes a first and second tray link 22 and 23 pivotally mounted to the tray at first and second tray pivots 24 and 25 respectively. The first and second tray links 22 and 23 include a first box link pivot mounting the intersection of the first and second tray links to a first horizontal box linkage 26. FIG. 6 illustrates a second horizontal box linkage 27 mounted forwardly of the first box linkage in alignment therewith to provide additional extension of the tray 11. Each box linkage comprises a first box link and second box link 28 and 29 respectively mounted to the first box link pivot 32, with a third and fourth box link 30 and 31 respectively pivotally mounted through a third and fourth box link pivot 34 and 35 to the respective first and second box links 28 and 29. A second box link pivot 33 mounts the forward intersection of the third and fourth box links 30 and 31 to the first and second hook links 36 and 37. The hook links 36 and 37 include a respective first and second hook link leg 38 and 39 fixedly and orthogonally mounted to a forward terminal end of each of the first and second hook links 36 and 37 for reception within the window slot 20 mounting a window within the associated automotive door 19.

A further modified automotive tray apparatus 10b, as illustrated in FIG. 7, utilizes in addition to the structure as set forth in the embodiment of FIG. 10 a, as illustrated in FIGS. 5 and 6, includes a single vertical extensible linkage 41. The extensible linkage includes a first, second, and third respective vertical box linkage 43, 44, and 45. A first and second vertical tray link 47 and 48 is mounted to a bottom surface of the tray 11 orthogonally thereto, with a wing nut and fastener 46 directed through the union pivot 40 defining the forward intersection of the first and second vertical tray links 47 and 48 in association with the upper pivot of the first vertical box linkage 43. Each box linkage includes a union pivot 40 joining the series of aligned box linkages together. Each of the box linkages includes a first, second, third, and fourth box linkage 28, 29, 30, and 31 in a manner as described per the box linkages as utilized in FIG. 5. A support plate 42 is pivotally mounted to a forward union pivot 40 of the third vertical box linkage 45 for positioning upon an underlying support surface of an automotive interior to stabilize the tray 11 in use and fixedly positioning the plate 42 by tightening of the wing nut and fastener structure 46 at the first uppermost union pivot 40, as illustrated.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive tray apparatus for securement within a window slot within an automotive door, wherein the apparatus comprises,
    a planar tray, wherein the planar tray includes a surrounding wall, and
    an aligned series of walls directed below the planar floor, and
    wherein the tray and the surrounding wall include spaced sides and spaced ends, the sides orthogonally arranged relative to the ends, and a first hook pair mounted to one of said ends directed outwardly therefrom and a second hook pair mounted to one of said sides directed outwardly therefrom, wherein the second hook pair is arranged orthogonally relative to the first hook pair, and
    wherein the first hook pair includes a first hook with a first horizontal leg integrally and orthogonally mounted to a first vertical leg, and further including a second hook with a second horizontal leg integrally and orthogonally mounted to a second vertical leg, wherein the first and second vertical legs are arranged for reception within the window slot, and
    wherein the second hook pair includes a first and second hook member, the first hook member includes a first extensible and retractable linkage and the second hook member includes a second extensible and retractable linkage.

2. An apparatus as set forth in claim 1 wherein the first and second extensible linkage are of identical configuration, and each linkage comprises a plurality of box linkages aligned relative to one another, each box linkage includes a first, a second, a third, and a fourth link member, each link includes a forward and rear terminal end, and the rear terminal ends of the first and second link members joined at a rear first pivot, and the third and fourth link members joined at a forward second pivot, the first and third link members pivotally joined at a third pivot and the second and fourth link members joined at a fourth pivot, and each of the first and second extensible linkages further includes a first and second hook link, the first hook link coextensive with the fourth link of the forwardmost box linkage of said plurality of box linkages, and the second hook link coextensively aligned with and joined to a third link of the forwardmost box link of the plurality of box linkages, each first and second hook link including a vertical leg integrally and orthogonally joined to each of the first and second hook links for reception within the window slot.

3. An apparatus as set forth in claim 2 further including bottom linkage member including a single vertical extensible linkage mounted orthogonally and downwardly relative to a bottom surface of the tray floor, the vertical extensible linkage including a plurality of bottom box linkages.

* * * * *